Figure 1:
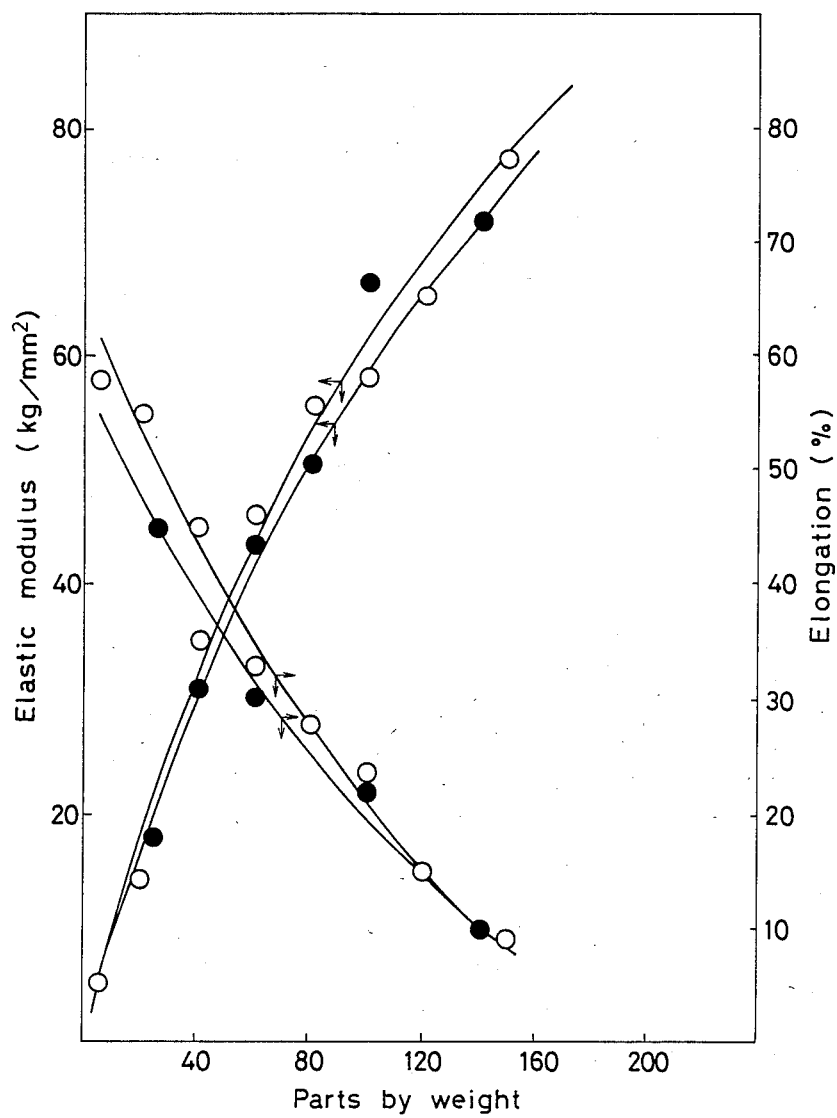

United States Patent [19]

Takeyama et al.

[11] Patent Number: 4,902,440
[45] Date of Patent: Feb. 20, 1990

[54] UV-CURABLE RESIN COMPOSITIONS

[75] Inventors: Hidekazu Takeyama, Hiratsuka; Yoshinobu Ohashi, Odawara; Shuji Okagawa, Ichihara; Masayuki Nishimoto, Ichihara; Masao Nishimura, Ichihara, all of Japan

[73] Assignee: The Yokohama Rubber Co., Ltd., Tokyo, Japan

[21] Appl. No.: 75,795

[22] Filed: Jul. 20, 1987

[30] Foreign Application Priority Data

Jul. 21, 1986 [JP] Japan .................. 61-169772
Apr. 30, 1987 [JP] Japan .................. 62-104354

[51] Int. Cl.$^4$ .................. C09K 3/00; C08J 5/34
[52] U.S. Cl. .................. 252/182.18; 524/101; 524/108; 522/96
[58] Field of Search .................. 524/101, 108; 252/182.18; 522/96

[56] References Cited

U.S. PATENT DOCUMENTS 3,141,450  7/1964  Lybeck .................. 524/101
3,350,489  10/1967  Jamison .................. 524/108

FOREIGN PATENT DOCUMENTS 0009664  1/1980  Japan .................. 524/101
0023121  2/1980  Japan .................. 524/101
0202112  10/1985  Japan .................. 524/101
2163172  2/1986  United Kingdom .................. 524/101
2163755  3/1986  United Kingdom .................. 524/101

OTHER PUBLICATIONS

Yokoshima et al, Chemical Abstracts 104:226013j (1986), see JP 60-202112.
Watanabe et al, Chemical Abstracts 105:79540u (1986), see JP 61-14210.
Watanabe et al, Chemical Abstracts 105:79539a (1986), see JP 61-14211.
Watanabe et al, Chemical Abstracts 105:99264k (1986), see JP 61-14212.

*Primary Examiner*—Harold D. Anderson
*Assistant Examiner*—Dennis R. Daley
*Attorney, Agent, or Firm*—Armstrong, Nikaido, Marmelstein, Kubovcik & Murray

[57] ABSTRACT

A UV-curable resin composition, which comprises blending urethane acrylate with tris(2-acryloxyethyl)isocyanurate, or with tris(2-acryloxyethyl)isocyanurate and with diacrylate, which composition has a low viscosity and a good drawing workability before curing and cures rapidly by ultraviolet radiation to give cured products having a high elastic modulus, a high elongation and a low water-absorption.

8 Claims, 2 Drawing Sheets

UV-CURABLE RESIN COMPOSITIONS

BACKGROUND OF THE INVENTION

The present invention relates to ultraviolet rays (UV)-curable resin compositions, which provide cured products having high elastic moduli, high elongations, low water-absorption and low viscosities. These UV-curable resin compositions are utilized as coating material and are especially effective as secondary coating material for optical fibers.

Optical fibers are in general subjected to coating with resin along with the drawing operation, since possible minute defects on the surface of fibers may give rise to a drop in the intensity of light. The coating generally comprises two layers, consisting of a primary coating material having a lower modulus for direct protection of the surface of fibers and a secondary coating material having a higher modulus to render strengths to fibers. Furthermore, UV-curable resins have increasingly been utilized in recent years as coating material for increasing drawing speed to improve productivity.

Among other properties required for the secondary coating materials, appropriate elastic modulus and elongation are required in order to maintain mechanical strengths, thereby preventing increase in optical transmission loss due to microbending. In addition, from the viewpoint of preventing humidity and water, they are required to have a low water-absorption. Furthermore, to increase drawing speed at processing operation, thereby improving productivity, a high curing rate is required.

Hitherto, as the secondary coating material for optical fiber, such materials which have elastic modulus of more than 10 kg/mm$^2$ and elongations of more than 10% have been used to maintain mechanical strengths and to prevent increase in optical transmission loss due to microbending. Further, to maintain water-resisting and humidity-resisting properties, materials having a water-absorption of less than 4% are used. Furthermore, for the purpose of improving productivity by drawing optical fibers at high speeds, materials which have viscosities less than 15000 cps at normal temperature (25° C.) are preferably used so far. However, these coating materials have some defects. For example, some of them have higher water-absorptions, though elastic moduli thereof are satisfactory, and the other ones have satisfactory elastic moduli and elongations, but viscosities thereof are high and furthermore curing rates are slow. There have been no materials which satisfy all of these characteristic properties properly.

Furthermore, the secondary coating layer becomes thinner as the diameters of optical fibers are reduced step by step, and therefore coating materials which have higher elastic moduli and elongations, sufficient toughness and well-balanced properties are required.

SUMMARY OF THE INVENTION

An object of this invention is to provide UV-curable resin compositions, which have higher elastic moduli, higher elongations, lower water-absorptions and lower viscosities, and which cure rapidly, and is particularly to provide UV-curable resin compositions, which have especially higher elastic moduli, higher elongations, sufficient toughness and well-balanced properties. These compositions are particularly used efficiently as secondary coating material for optical fibers.

To attain this object, the present invention provides a UV-curable resin composition which comprises blending 100 parts by weight of a urethane acrylate, which has been prepared by reacting hydrogenated 4,4'-diphenylmethane diisocyanate (4,4,'-dicyclohexylmethane diisocyanate) with both ends of polytetramethylene glycol having a molecular weight of 650–1300 and then reacting the reaction product with a compound having a hydroxyl group and an acryloyl group in one molecule, with 10–140 parts by weight of a compound having the below-mentioned formula (1) or of a compound having the formula (1) and a compound having the below-mentioned formula (2) (hereinafter referred to as Composition A).

The gist of the invention resides also in a UV-curable resin composition which comprises blending 100 parts by weight of a urethane acrylate, which has been prepared by reacting hydrogenated 4,4'-diphenylmethane diisocyanate with both ends of polytetramethylene glycol having a molecular weight of 650–1300 and then reacting the reaction product with a compound having a hydroxyl group and an acryloyl group in one molecule, with 10–140 parts by weight of a compound having the formula (1) or of a compound having the formula (1) and a compound having the formula (2), and further with 1–40 parts by weight of N-vinylpyrrolidone (hereinafter referred to as Composition B).

In addition, the gist of the invention resides in a UV-curable resin composition which comprises blending 100 parts by weight of a urethane acrylate, which has been prepared by reacting hydrogenated 4,4'-diphenylmethane diisocyanate with both ends of polytetramethylene glycol having a molecular weight of 650–1300 and then reacting the reaction product with a compound having a hydroxyl group and an acryloyl group in one molecule, with 10–140 parts by weight of a compound having the formula (1) or of a compound having the formula (1) and a compound having the formula (2), and further with 1–40 parts by weight of one or more of acryloyl morpholine and dicyclopentanyl acrylate (hereinafter referred to as Composition C).

Furthermore, the gist of the invention resides in a UV-curable resin composition which comprises blending 100 parts by weight of a urethane acrylate, which has been prepared by reacting hydrogenated 4,4'-diphenylmethane diisocyanate with both ends of polytetramethylene glycol having a molecular weight of 650–1300 and then reacting the reaction product with a compound having a hydroxyl group and an acryloyl group in one molecule, with 10–140 parts by weight of a compound having the formula (1) or of a compound having the formula (1) and a compound having the formula (2), with 1–40 parts by weight of one or more of acryloyl morpholine and dicyclopentanyl acrylate, and further with 1–40 parts by weight of N-vinylpyrrolidone (hereinafter referred to as Composition D).

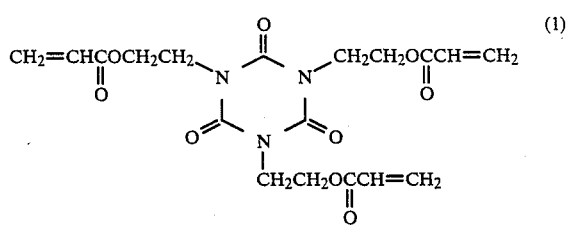

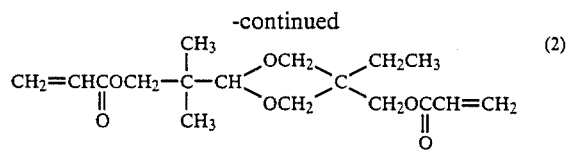

The above and other related objects and features of the invention will be apparent from a reading of the following description of the disclosure.

THE DRAWINGS

Figure 2:
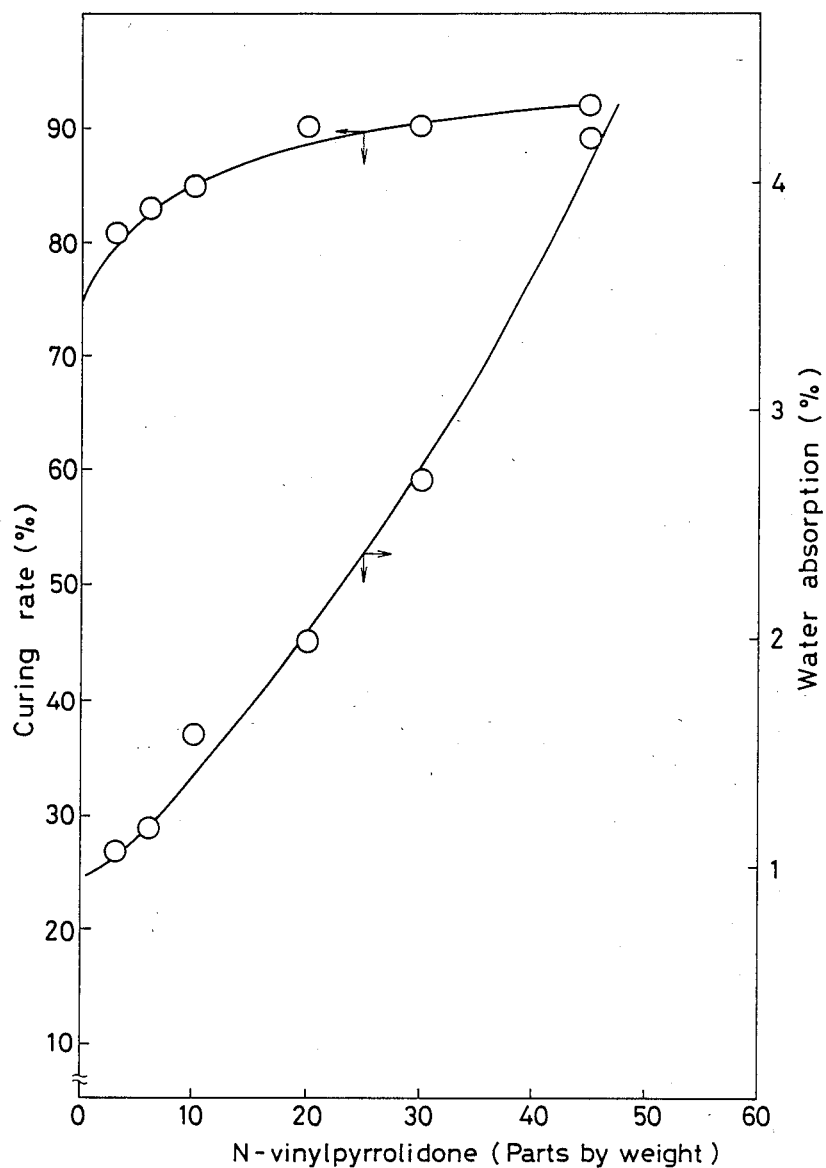

FIG. 1 is the relationship between blending proportions, and elastic moduli and elongations, of a compound of the formula (1) or of a compound of the formula (1) and a compound of the formula (2); and FIG. 2 is a graph showing the relationship between blending amount and curing rate and water absorption, of N-vinylpyrrolidone.

THE PREFERRED EMBODIMENTS (A) Composition A.

(a) Urethane acrylate.

This is an acrylic oligomer obtained by reacting hydrogenated 4,4'-diphenylmethane diisocyanate (hydrogenated MDI) with both ends of polytetramethylene glycol (molecular weight 650-1300) and then reacting the reaction product with a compound having a hydroxyl group and an acryloyl group in one molecule. Here, by compounds having a hydroxyl group and an acryloyl group in one molecule are meant those compounds such as 2-hydroxyethyl acrylate and 2-hydroxypropyl acrylate. As examples of isocyanate compounds, mention is made of MDI (diphenylmethane diisocyanate), TDI (tolylene diisocyanate), IPDI (isophorone diisocyanate), HDI (hexamethylene diisocyanate), hydrogenated MDI and the like. In the present invention, hydrogenated MDI is used since it is most preferable for obtaining compositions which cure rapidly.

Among glycol components such as polyester glycol and polypropylene glycol, polytetramethylene glycol is used in this invention for the purpose of improving water-resistant and heat-resistant properties in resulting compositions. As to molecular weights of the glycol, molecular weights between 650 and 1300 are preferred for affording sufficient elastic modulus and elongations to resulting compositions. With molecular weights less than 650, enough elongations can not be obtained, while with molecular weights over 1300, enough elastic modulus can not be attained.

(b) Tris(2-acryloxyethyl)isocyanurate [aforementioned formula (1)], diacrylate [aforementioned formula (2)].

Of these compounds, use is made of compound (1) alone or of compound (1) and compound (2) in combination. The use of these compounds is important for cured products, which are obtained by curing the resulting composition with ultraviolet rays, to increase elastic modulus without changing elongations and to give a lower water-absorption. The proportion of said compounds is 10-140 parts by weight, preferably 30-100 parts by weight, to 100 parts by weight of urethane acrylate. With a proportion less than 10 parts by weight, elastic modulus of cured products become less than 10 kg/mm$^2$, whereas with a proportion over 140 parts by weight, the cured products show elongations less than 10%, resulting in poor mechanical properties which are necessary for the secondary coating on optical fiber. Furthermore, when both compounds are used, of 10-140 parts by weight of tris(2-acryloxyethyl)isocyanurate [formula (1)] and diacrylate [formula (2)], the proportion of diacrylate represented by the formula 2 should be less than 20 parts by weight. It is preferable for resin compositions to contain diacrylate represented by formula (2) of less than 20 parts by weight, in order to improve such properties as viscosity, crystallization and the like, although the compositions may contain no diacrylate. The upper limit of the diacrylate is 20 parts by weight, and beyond this limit, the resulting resin compositions cure very slowly and it is unfavorable.

The use of these two types of acrylates is important to obtain cured products with a low water-absorption, since a high water-absorption renders the strength of optical fiber low.

(B) Composition B.

The above-mentioned Composition A is as such satisfactorily used for the secondary coating for optical fibers. However, to meet demand for higher drawing speeds of optical fibers and for improving productivity, the present invention makes it possible to increase curing rate of the resin compositions without altering other characteristic properties, by blending Composition A with N-vinylpyrrolidone. Thus, the invention also provides a UV-curable resin composition which comprises 100 parts by weight of urethane acrylate, 10-140 parts by weight of tris(2-acryloxyethyl)isocyanurate represented by the formula (1) alone or in combination with diacrylate represented by the formula (2) [provided that the diacrylate represented by the formula (2) is present in an amount of less than 20 parts by weight] and 1-40 parts by weight of N-vinylpyrrolidone.

The bending proportion of N-vinylpyrrolidone is 1-40 parts by weight, preferably 3-20 parts by weight. With blending proportion less than one part by weight, no change is noticed in curing rate, and with blending proportion over 40 parts by weight, water-absorption becomes more than 4%, resulting in the cured products which are unfavorable as the secondary coating. In using N-vinylpyrrolidone, it is preferable to use it in combination with tris(2-acryloxyethyl)isocyanurate represented by the formula (1) and diacrylate represented by the formula (2), in order to keep a balance among characteristic properties such as elastic modulus, elongation, water-absorption and curing rate. This is especially important to keep water-absorption low.

(C) Composition C.

Composition A comprising the compounds (a) and (b) can be as such satisfactorily used as material for the secondary coating on optical fibers. However, there are demand for material having higher elastic modulus and higher elongations, in order to attain sufficient strength even in case of optical fibers with extremely fine diameter.

To meet such requirements, the present invention makes it possible to obtain materials having higher elastic modulus and higher elongations without altering other characteristic properties, by blending the above-mentioned Composition A with one or more of acryloyl morpholine having the below-mentioned formula (i) and dicyclopentanyl acrylate having the below mentioned formula (ii) (concretely speaking, elastic modulus more than 60 kg/mm$^2$, elongations more than 30%).

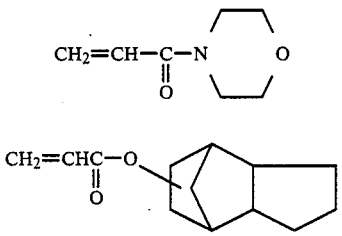

Thus, the invention also provides a UV-curable resin composition comprises 100 parts by weight of urethane acrylate, 10–140 parts by weight of tris(2-acryloxyethyl)isocyanurate represented by the formula (1) alone or in combination with diacrylate represented by the formula (2) [provided that the diacrylate represented by the formula (2) is present in an amount of less than 20 parts by weight] and 1–40 parts by weight of one or more of acryloyl morpholine and dicyclopentanyl acrylate.

The blending proportion of the acrylate(s) selected from the group of acryloyl morpholine and dicyclopentanyl acrylate is 1–40 parts by weight, preferably 3–20 parts by weight. The content of the acrylate less than one part by weight does not favorably affect the elastic modulus and if the content of the acrylate is more than 40 parts by weight, the cured products show a high water-absorption and this is unfavorable for the secondary coating on optical fiber. In using acryloyl morpholine and dicyclopentanyl acrylate, it is preferable to use them in combination with tris(2-acryloxyethyl)isocyanurate represented by the formula (1) and diacrylate represented by the formula (2), in order to keep a balance of characteristics such as higher elastic modulus, elongation, water absorption and curing rate. Especially, this is important to maintain a high elastic modulus (more than 60 kg/mm$^2$) and a high elongation (more than 30%).

(D) Composition D.

Although the above-mentioned Composition C is as such satisfactorily usable as secondary coating material, it is required to have a lower viscosity when a further improvement in the drawing processability is desired. According to the invention, this problem is solved by blending the Composition C with N-vinylpyrrolidone. So, by blending Composition C with N-vinylpyrrolidone, it is possible to increase the curing rate without affording the other properties. By utilizing this characteristic feature, the addition of said compound to Composition C makes it possible to attain a lower viscosity without lowering the curing rate. This improves the drawing processability.

The content of N-vinylpyrrolidone is 1–40 parts by weight. Thus, the invention also provides a UV-curable resin composition comprises 100 parts by weight urethane acrylate, 10–140 parts by weight of tris(2-acryloxyethyl)isocyanurate represented by the formula (1) alone or in combination with diacrylate represented by the formula (2) [provided that the content of the diacrylate represented by the formula (2) is less than 20 parts by weight], of 10–140 parts by weight], 1–40 parts by weight of one or more of acryloyl morphorine and dicyclopentanyl acrylate and further 1–40 parts by weight of N-vinylpyrrolidone. With the content of N-vinylpyrrolidone less than one part by weight, no effect is obtained and with the content more than 40 parts by weight, the cured product shows a higher water absorption and is unfavorable for the secondary coating on optical fiber. Furthermore, in using N-vinylpyrrolidone, it is preferable to use in combination with tris(2-acryloxyethyl)isocyanurate represented by the formula (1) and diacrylate represented by the formula (2), in order to keep a balance of characteristic properties such as elastic modulus, elongation, water absorption and curing rate. This is especially important for maintaining a high elastic modulus (more than 60 kg/mm$^2$) and a high elongation (more than 30%).

(E) For the compositions as mentioned above, a variety of reactive diluents can be blended with the compositions to adjust their viscosities and to improve their workabilities. As reactive diluents, various mono acrylates are used, which include 2-ethylhexyl acrylate, lauryl acrylate, 2-hydroxyethyl acrylate, 2-methoxyethyl acrylate, 2-ethoxyethyl acrylate, 2-butoxyethyl acrylate, 2-phenoxyethyl acrylate, dicyclopentanyl acrylate, dicyclopentanyloxyethyl acrylate, isobornyl acrylate, tetrahydrofurfuryl acrylate, phenoxydiethyleneglycol acrylate, and nonylphenoxyethyleneglycol acrylate. Especially, phenoxyethyl acrylate, isobornyl acrylate, phenoxydiethyleneglycol acrylate and dicyclopentanyloxyethyl acrylate. These can be alone or as a combination of two or more. The proportion of these monoacrylates is preferably less than 60 parts by weight per 100 parts by weight of urethane acrylate for the purpose of not impairing characteristic properties such as elastic modulus, elongation, and water-absorption causing from urethane acrylate, tris(2-acryloxyethyl)isocyanulate and diacrylate of formula (2).

Furthermore, a photopolymerization initiator is blended. Radical cleavage type, hydrogen-abstraction type and other any type of initiators can be used. For example, 2,2-dimethoxy-2-phenylacetophenone, 1-hydroxycyclohexylphenyl ketone, benzoin, benzoin methyl ether, benzoin ethyl ether, benzoin isopropyl ether, 2-hydroxy-2-methylpropiophenone, benzil, benzophenone, 2-methyl[4(methylthio)phenyl]-2-morpholino-1-propanone, 2-methylanthraquinone, 2,4-diethylthioxanthone and the like are effectively used. The amount to be used less than 0.5–10% by weight, preferably less than 1–5% by weight.

Furthermore, the compositions according to the present invention may contain various types of additives, such as antioxidants, polymerization inhibitors, levelling agents, antifoaming agents and the like.

The UV-curable resin compositions according to the invention so obtained can cure more rapidly into a cured products having well-balanced characteristic properties, resulting in effective use as the secondary coating material on optical fiber.

Hereinafter working examples and comparative examples are shown.

EXAMPLES AND COMPARATIVE EXAMPLES:

(I) The resin compositions were prepared by blending the below-mentioned compounds in the blending proportions (parts by weight) shown in Tables 1, 2 and 3;

① Urethane acrylate of the formula (3):

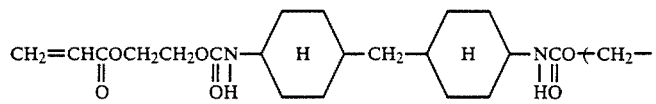

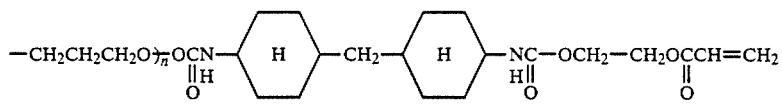

n = 10-12

② Phenoxyethyl acrylate of the formula (4):

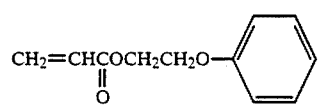

③ Tris (2-acryloxyethyl)isocyanurate of the formula (1):

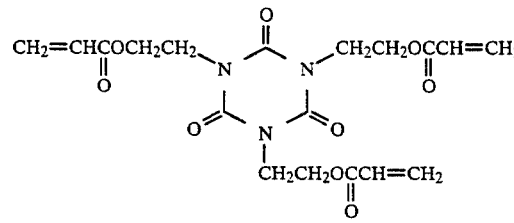

④ Diacrylate of the formula (2):

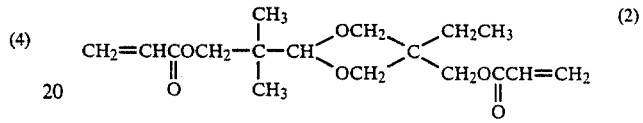

The physical properties of the cured products were determined by curing the above-mentioned resin compositions by giving a predetermined energy from a UV lamp (80 W/cm$^2$, 1 k.W metal halide lamp) and forming a sheet with a thickness of 200 μm. The values of elastic modulus and elongation were determined in accordance with JIS K7113, using samples which were obtained by punching out with No. 2 plastics dumbbell from the sheet, which had been prepared by exposing the resin composition to ultraviolet rays of 1000 m J/cm$^2$ energy. Curing velocities were determined by measuring elastic modulus for samples of sheets having a thickness of 200 μm which had been made by exposing said resin composition to ultraviolet rays of 100 m J/cm$^2$ and 1000 m J/cm$^2$, respectively, and by calculating the percentage of the modulus at 100 m J/cm$^2$ as compared with the value of the modulus at 1000 m J/cm$^2$ of 100%. Water-absorptions were determined in accordance with JIS K7209B method, using sheets cured at 1000 m J/cm$^2$. These results are shown in Tables 1, 2 and 3.

TABLE 1

| | Example 1 | Example 2 | Example 3 | Example 4 | Example 5 | Example 6 | Comparative Example 1 | Comparative Example 2 | Comparative Example 3 | Comparative Example 4 | Comparative Example 5 |
|---|---|---|---|---|---|---|---|---|---|---|---|
| Urethane acrylate | 100 | 100 | 100 | 100 | 100 | 100 | 100(1) | 100(2) | 100(3) | 100 | 100 |
| Compound of the formula (1) | 20 | 40 | 60 | 80 | 100 | 120 | 40 | 40 | 40 | 5 | 150 |
| Phenoxyethyl acrylate | 30 | 35 | 40 | 45 | 50 | 55 | 35 | 35 | 35 | 26 | 63 |
| Photopolymerization initiator | 5 | 5 | 5 | 5 | 5 | 5 | 5 | 5 | 5 | 5 | 5 |
| Elastic modulus (kg/mm$^2$) | 14.3 | 35.1 | 46.3 | 55.6 | 58.0 | 65.0 | 34.7 | 32.0 | 32.5 | 5.2 | 77.0 |
| Elongation (%) | 55 | 45 | 33 | 28 | 24 | 15 | 47 | 45 | 45 | 58 | 9 |
| Curing rate (%) | 68 | 70 | 80 | 85 | 80 | 84 | 55 | 54 | 55 | 65 | 85 |
| Water-absorption | 1.0 | 1.2 | 1.2 | 1.5 | 2.0 | 2.3 | 1.5 | 1.5 | 1.3 | 0.9 | 2.5 |

TABLE 1-continued

|  | Example 1 | Example 2 | Example 3 | Example 4 | Example 5 | Example 6 | Comparative Example 1 | Comparative Example 2 | Comparative Example 3 | Comparative Example 4 | Comparative Example 5 |
|---|---|---|---|---|---|---|---|---|---|---|---|
| (%) | | | | | | | | | | | |

Notes:
(1) PTMG850/MDI/2HEA
(2) PTMG850/TDI/2HEA
(3) PTMG850/IPDI/2HEA
PTMG850 Polytetramethylene glycol (average molecular weight: 850)
MDI Diphenylmethane diisocyanate
TDI Tolylene diisocyanate
IPDI Isophorone diisocyanate
2HEA 2-hydroxyethyl acrylate In Examples 1–6 and Comparative Examples 1, 2, 3, 4 and 5 on Table 1, elastic modulus, elongations, water absorption and curing velocities were determined, using resin compositions containing phenoxyethyl acrylate with a photopolymerization initiator dissolved therein in combination with predetermined amounts of tris(2-acryloxyethyl)isocyanurate and urethane acrylate. In Examples 1–6, elastic modulus and elongations are more than 10 kg/mm² and more than 10%, respectively. However, as is seen from Comparative Example 4, when the content of Compound (1) is less than 10 parts by weight, elastic modulus obtained becomes less than 10 kg/mm². On the contrary, as is seen from Comparative Example 5, when the content of Compound (1) is over 140 parts by weight, elongations become less than 10%. These cases show that the resulting products are unsatisfactory as material for the secondary coating.

In Comparative Example 1, a urethane acrylate is used, which has been obtained by reacting MDI (diphenylmethane diisocyanate) with both ends of polytetramethylene glycol (molecular weight 850) and then reacting the resulting product 2HEA (2-hydroxyethyl acrylate).

In Comparative Examples 2 and 3, similarly, a urethane acrylate is used, which has been obtained by reacting TDI (tolylene diisocyanate) and IPDI (isophorone diisocyanate), respectively with both ends of polytetramethylene glycol and then reacting the resulting product with 2HEA. As is seen from the comparison with Example 2, the curing velocities are slow in both cases, and this proves that hydrogenated MDI is most preferable as isocyanate.

TABLE 2

|  | Example 7 | Example 8 | Example 9 | Example 10 | Example 11 | Example 12 | Comparative Example 6 | Comparative Example 7 |
|---|---|---|---|---|---|---|---|---|
| Urethane acrylate | 100 | 100 | 100 | 100 | 100 | 100 | 100 | (1)100 |
| Compound of the formula (1) | 5 | 20 | 40 | 60 | 80 | 120 | 30 | 35 |
| Compound of the formula (2) | 20 | 20 | 20 | 20 | 20 | 20 | 30 | 20 |
| Phenoxyethyl acrylate | 31 | 35 | 40 | 45 | 50 | 60 | 40 | 30 |
| Photopolymerization initiator | 5 | 5 | 5 | 5 | 5 | 5 | 5 | 5 |
| Elastic modulus (kg/mm²) | 18.0 | 30.1 | 43.4 | 50.1 | 66.5 | 72.0 | 41.3 | 35.5 |
| Elongation (%) | 45 | 35 | 30 | 28 | 22 | 10 | 30 | 35 |
| Curing rate (%) | 70 | 75 | 80 | 82 | 82 | 85 | 60 | 53 |
| water-absorption (%) | 0.9 | 1.0 | 1.2 | 1.5 | 1.7 | 2.0 | 1.2 | 1.9 |

Note:
(1) PTMG850/MDI/2HEA.

In Table 2, in Examples 7–12 and Comparative Examples 6 and 7, using Compound (1) and Compound (2) similarly as in Table 1, urethane acrylate, phenoxyethyl acrylate and a photopolymerization initiator are mixed, and elastic modulus, elongations, water-absorption and curing velocity are determined. In Table 2, in Examples 7–12, wherein 20 parts by weight of diacrylate are used, elastic modulus of more than 10 kg/mm² and elongations of more than 10%. However, as is shown in Comparative Example 6, when 30 parts by weight of diacrylate represented by the formula (2) are used, the curing velocity becomes 60%, this is not favorable from the point view of curing velocity. In Comparative Example 7, urethane acrylate is used which has been obtained by reacting MDI (diphenylmethane diisocyanate) with both ends of polytetramethylene glycol (molecular weight 850) and then reacting 2-HEA (2-hydroxyethyl acrylate) with the resulting product. As is apparent from the comparison with Examples 8 and 9, it is better to use urethane acrylate represented by the formula (3) in place of this urethane acrylate, for the purpose of speeding up of curing velocity.

TABLE 3

|  | Example 13 | Example 14 | Example 15 | Example 16 | Example 17 | Comparative Example 8 |
|---|---|---|---|---|---|---|
| Urethane acrylate | 100 | 100 | 100 | 100 | 100 | 100 |
| Compound of the formula (1) | 50 | 50 | 50 | 50 | 50 | 50 |
| Compound of the formula (2) | 10 | 10 | 10 | 10 | 10 | 10 |
| Phenoxyethyl acrylate | 41 | 41 | 43 | 45 | 48 | 40 |
| N—vinyl-pyrrolidone | 3 | 6 | 10 | 20 | 30 | 45 |
| Photopolymerization initiator | 5 | 5 | 5 | 5 | 5 | 5 |
| Elastic modulus (kg/mm$^2$) | 46.8 | 48.6 | 50.9 | 57.5 | 63.9 | 68.0 |
| Elongation (%) | 30 | 30 | 30 | 35 | 33 | 36 |
| Curing rate (%) | 81 | 83 | 85 | 90 | 90 | 92 |
| Water-absorption (%) | 1.1 | 1.2 | 1.6 | 2.0 | 2.7 | 4.2 |

In Table 3, the components mixed in a similar method as in Tables 1 and 2 were blended with N-vinylpyrrolidone in various proportions. As is seen from Examples 13–17, with elastic modulus of over 10 kg/mm$^2$, elongations of over 10% and water-absorption of less than 4%, the curing velocity is also considerably rapid (more than 80%). As is shown in Comparative Example 8, when the content of N-vinylpyrrolidone is 45 parts by weight, water-absorption becomes over 4%, giving unfavorable results.

FIG. 1 is a graph showing the relationship between blending proportions (in parts by weight) of the compound of the formula (1) or of the combination of the compound of the formula (1) with that of the formula (2) per 100 parts by weight of urethane acrylate and elastic modulus and elongations. From FIG. 1, it is apparent that in order to attain elastic modulus of over 10 kg/mm$^2$ and elongations of over 10%, it is preferable to use 10–140 parts by weight of the compound (1) or a combination of the compound (1) and the compound (2) per 100 parts by weight of urethane acrylate. Further in FIG. 1, the reference character, a white circle (o) designates the case of the compound (1) and a black circle (•) the combination of the compounds (1) and (2).

FIG. 2 is a graph showing the relationship between the proportions parts by weight of N-vinylpyrrolidone and the curing velocity and the water-absorption. From FIG. 2, it is apparent that, in order to attain curing velocity of over 80% and water-absorption of less than 4%, the addition of 1–40 parts by weight of N-vinylpyrrolidone to the blend which comprises 100 parts by weight of urethane acrylate and 10–140 parts by weight of the compound (1) alone or of the compounds (1) and (2) is preferable.

Next, on an optical fiber, which had been spun up to 125 m$\phi$ at a drawing speed of 200 m/min, a UV-curable resin composition having a Young's modulus of 0.1 kg/mm$^2$ was coated as the primary coating up to 250 $\mu$m$\phi$ and then cured by a metal halide lamp of 3 kW, and subsequently the resin composition according to Example 14 was coated up to 400 m$\phi$ and then cured by exposing to ultraviolet radiation by a metal halide lamp of 3 kW. An optical fiber obtained showed no increase in optical transmission loss and had a strength of 6 kg. Furthermore, the coated optical fiber showed no increase in optical transmission loss and no deterioration in strength, even after 60 days of 95% RH humidity-heat test at 60° C.

(II) Resin compositions were prepared by blending the below-mentioned compounds at the blending proportions (parts by weight) shown in Tables 4 and 5:

① Urethane acrylate represented by the formula (3):

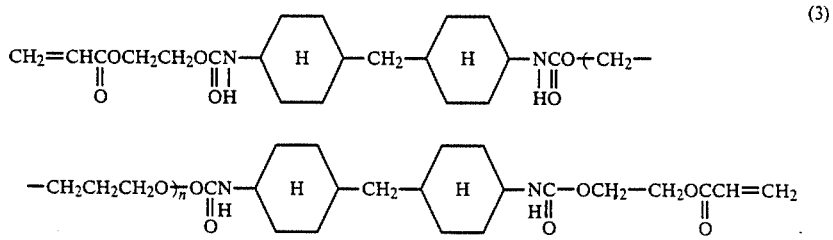

(3)

n = 10–12

② Phenoxyethyl acrylate represented by the formula (4):

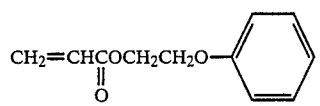

(4)

③ Acryloyl morpholine represented by the formula (i):

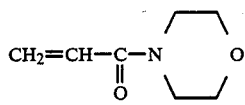

④ Dicyclopentanyl acrylate represented by the formula (ii):

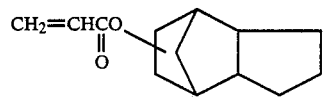

⑤ Tris (2-acryloxyethyl)isocyanurate represented by the formula (1):

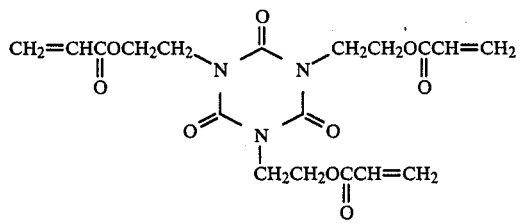

⑥ Diacrylate represented by the formula (2):

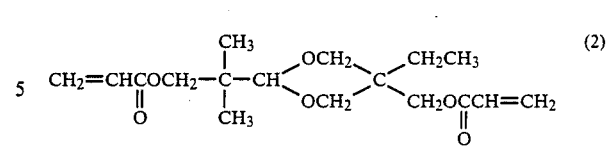

The physical properties of the cured products were determined by curing the above-mentioned resin compositions by exposing to a predetermined energy from a UV lamp (80 W/cm², 1 kW metal halide lamp), and forming a sheet with a thickness of 200 um. The values of elastic modulus and elongations were determined in accordance with JIS K7113, using samples which were obtained by punching out with No. 2 plastics dumbbell from the sheet, which had been prepared by exposing the resin composition to ultraviolet rays of 100 m J/cm². Curing velocities were determined by measuring elastic modulus for samples of sheets with a thickness of 200 μm which had been made by exposing said resin composition to ultraviolet rays of 100 m J/cm² and 1000 m J/cm², respectively, and by calculating the percentage of the modulus at 100 m J/cm² as compared with the value of the modulus at 1000 m J/cm² of 100%. Water-absorptions were determined in accordance with JIS K7209B method, using sheets cured at 1000 m J/cm². These results are shown in Tables 4 and 5.

TABLE 4

|  | Example 18 | Example 19 | Example 20 | Example 21 | Example 22 | Example 23 | Example 24 | Example 25 | Example 26 | Example 27 | Comparative Example 9 *A | Comparative Example 10 *B | Comparative Example 11 *C | Comparative Example 12 *A | Comparative Example 13 *A |
|---|---|---|---|---|---|---|---|---|---|---|---|---|---|---|---|
| Urethane acrylate | 100 | 100 | 100 | 100 | 100 | 100 | 100 | 100 | 100 | 100 | 100 | 100 | 100 | 100 | 100 |
| Compound of the formula (1) | 40 | 40 | 40 | 20 | 20 | 20 | 40 | 20 | 40 | 20 | 40 | 40 | 40 | 40 | 20 |
| Compound of the formula (2) |  |  |  | 20 | 20 | 20 |  | 20 |  | 20 |  |  |  | 30 | 20 |
| Acryloyl morpholine | 35 |  | 20 | 35 |  | 20 |  |  |  |  | 35 | 35 | 35 | 35 | 35 |
| Dicyclopentanyl acrylate |  | 35 | 15 |  | 35 | 15 |  |  |  |  |  |  |  |  |  |
| N—vinylpyrrolidone |  |  |  |  |  |  |  |  | 35 | 35 |  |  |  |  |  |
| Phenoxyethyl acrylate |  |  |  |  |  |  | 35 | 35 |  |  |  |  |  |  |  |
| Photopolymerization initiator | 5 | 5 | 5 | 5 | 5 | 5 | 5 | 5 | 5 | 5 | 5 | 5 | 5 | 5 | 5 |
| Elastic modulus (kg/mm²) | 68 | 70 | 68 | 70 | 71 | 70 | 35.1 | 30.1 | 54 | 58 | 67 | 68 | 68 | 70 | 70 |
| Elongation (%) | 38 | 37 | 37 | 37 | 37 | 37 | 45 | 35 | 40 | 35 | 37 | 37 | 37 | 37 | 37 |
| Curing rate (%) | 87 | 86 | 87 | 90 | 88 | 88 | 70 | 75 | 90 | 90 | 55 | 54 | 55 | 60 | 58 |
| Water-absorption | 1.8 | 1.8 | 1.8 | 1.7 | 1.7 | 1.7 | 1.2 | 1.0 | 3.5 | 3.2 | 1.9 | 1.9 | 1.9 | 1.8 | 1.8 |

TABLE 4-continued

| | Example 18 | Example 19 | Example 20 | Example 21 | Example 22 | Example 23 | Example 24 | Example 25 | Example 26 | Example 27 | Comparative Example 9 *A | Comparative Example 10 *B | Comparative Example 11 *C | Comparative Example 12 *A | Comparative Example 13 *A |
|---|---|---|---|---|---|---|---|---|---|---|---|---|---|---|---|
| (%) | | | | | | | | | | | | | | | |

Note:
(A) PTMG850/MDI/2HEA.
(B) PTMG850/TDI/2HEA.
(C) PTMG850/IPDI/2HEA.
PTMG850: Polytetramethyleneglycol
$\overline{Mw}$ = 850
MDI: Diphenylmethane diisocyanate
TDI: Tolylene diisocyanate
IPDI: Isophorone diisocyanate In Examples 18, 19 and 20 on Table 4, acryloyl morpholine and dicyclopentanyl acrylate were used. As is apparent from comparing with Example 24, when one or more than one of acryloyl morpholine and dicyclopentanyl acrylate are used, elastic modulus of more than 60 kg/mm$^2$ and elongations of more than 30% are attained in each case.

As is seen from comparing with Example 25, Examples 21, 22 and 23, wherein the Compound (2) was used, show that even in these cases where acryloyl morpholine and dicyclopentanyl acrylate are used, elastic modulus are more than 69 kg/mm$^2$ and elongations more than 30%.

As is apparent from comparing Example 21 with Comparative Example 12, it is also shown that the content of the compound (2) less than 20 parts by weight is essential for improving curing velocity.

Comparative Examples 9, 10, 11 and 13 are examples wherein a urethane acrylate varying in isocyanate structure thereof was used. As is seen from the comparison of Comparative Examples 9, 10 and 11 with Example 18, it is apparent that, as to the isocyanate structure in urethane acrylate to be used, hydrogenated diphenylmethane diisocyanate is most favorable in attaining rapid curing rate.

Furthermore, as is apparent from the comparison of Examples 18 and 19 with Example 26, and of Examples 21 and 22 with Example 27, when N-vinylpyrrolidone is added elastic modulus become less than 60 kg/mm$^2$ and water-absorptions are also high. In this case, it is shown that the use of one or more of acryloyl morpholine and dicyclopentanyl acrylate is important for obtaining an optical fiber coating material, which has a high elastic modulus and high elongations and is well-balanced.

TABLE 5

| | Example 28 | Example 29 | Example 30 | Example 31 | Example 32 | Example 33 | Comparative Example 14 | Comparative Example 15 | Example 34 | Example 35 | Example 36 | Example 37 | Comparative Example 16 |
|---|---|---|---|---|---|---|---|---|---|---|---|---|---|
| Urethane acrylate | 100 | 100 | 100 | 100 | 100 | 100 | 100 | 100 | 100 | 100 | 100 | 100 | 100 |
| Compound of the formula (1) | 40 | 40 | 40 | 40 | 40 | 40 | 40 | 20 | 40 | 40 | 40 | 40 | 40 |
| Compound of the formula (2) | 12 | 12 | 12 | 12 | 12 | 12 | 12 | 12 | 12 | 12 | 12 | 12 | 12 |
| Acryloyl morpholine | 10 | 20 | 40 | | | | 50 | | | 10 | 20 | 40 | 40 |
| Dicyclopentanyl acrylate | | | | 10 | 20 | 40 | | 50 | | | | | |
| N—vinyl-pyrrolidone | 10 | 10 | 10 | 10 | 10 | 10 | 10 | 10 | 10 | | | | 45 |
| Phenoxyethyl acrylate | | | | | | | | | | 20 | | | |
| Photopolymerization initiator | 5 | 5 | 5 | 5 | 5 | 5 | 5 | 5 | 5 | 5 | 5 | 5 | 5 |
| Elastic modulus (kg/mm$^2$) | 72 | 70 | 62 | 71 | 66 | 61 | 55 | 56 | 45 | 68 | 65 | 60 | 80 |
| Elongation (%) | 30 | 35 | 37 | 30 | 35 | 37 | 42 | 42 | 40 | 35 | 35 | 37 | 35 |
| Curing rate (%) | 88 | 90 | 90 | 87 | 87 | 87 | 85 | 85 | 85 | 80 | 80 | 80 | 90 |
| Water-absorption (%) | 1.8 | 1.8 | 1.8 | 1.7 | 1.7 | 1.7 | 1.8 | 1.8 | 1.6 | 1.5 | 1.5 | 1.6 | 4.5 |
| Viscosity (cps) @ 25° C. | 9000 | 8000 | 5400 | 10000 | 7200 | 4900 | 6000 | 5800 | 7000 | 12000 | 11000 | 6800 | 4500 |

In Table 5, limitations are shown when acryloyl morpholine and dicyclopentanyl acrylate are used. As is seen from the comparison of Examples 28, 29 and 30 with Comparative Example 14, when the content of acryloyl morpholine is more than 40 parts by weight, elastic modulus becomes less than 60 kg/mm$^2$, showing that proportion less than 40 parts by weight is preferable. Similarly, when dicyclopentanyl acrylate is used, contents of less than 40 parts by weight are favorable, as is seen from the comparison of Examples 31, 32 and 33 with Comparative Example 15.

As is seen from the comparison of Examples 29 and 32 with Example 34, even when the compositions comprise compounds (1) and (2) and N-vinylpyrrolidone, it is apparent that the addition of acryloyl morpholine and dicyclopentanyl acrylate serves to attain a higher elastic modulus.

Furthermore, as is apparent from the comparison of Examples 28, 29 and 30 with Examples 35, 36 and 37 in the Table 5, the addition of N-vinylpyrrolidone to the resin compositions according to the invention serves to reduce the viscosity of the composition, resulting in facilitating the coating operation. In addition, Comparative Examples 17–20 show that the use of N-vinylpyrrolidone serves to provide lower viscosity without almost reducing curing speed. As to blending rate thereof, a content less than 40 parts by weight is preferable and as shown by Comparative Example 16 a content less than 40 parts by weight leads to higher water-absorption, resulting in an unfavorable material for coating optical fiber.

Next, on an optical fiber, which had been spun up to 125 μmφ at a drawing speed of 200 m/min, a UV-curable resin composition having a Young's modulus of 0.1 kg/mm² was coated as the primary coating material up to 250 μmφ and then cured by a metal halide lamp of 3 kW, and subsequently the resin composition according to Example 29 was coated up to 400 μmφ and then cured by exposing to ultraviolet radiation by a metal halide lamp of 3 kW. An optical fiber obtained showed no increase in transmission loss and had a strength of 6 kg. Furthermore, the coated optical fiber showed no increase in optical transmission loss and no deterioration in strength, even after 60 days of 95% RH humidity-heat test at 60° C.

As is explained in the above, according to UV-curable resin composition of the invention, cured products can be obtained, which have elastic modulus of more than 10 kg/mm², elongations of more than 30% and water-absorption of less than 4%. The composition can be effectively used as the secondary coating material on optical fiber, since it cures sufficiently rapidly.

We claim:

1. A UV-curable resin composition which comprises blending 100 parts by weight of a urethane acrylate, which has been prepared by reacting 4,4'-dicyclohexylmethane diisocyanate with both ends of polytetramethylene glycol having a molecular weight of 650–1300 and then reacting the reaction product with a compound having a hydroxyl group and an acryloyl group in one molecule, with 10–140 parts by weight of a compound having the below-mentioned formula (1) or of a compound having the formula (1) and a compound having the below-mentioned formula (2):

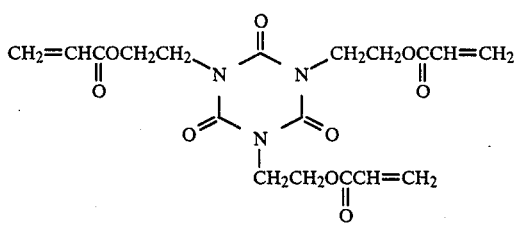

-continued

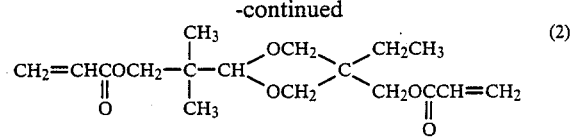

2. A UV-curable resin composition as claimed in claim 1, wherein the content of the compound having the formula (2) is less than 20 parts by weight:

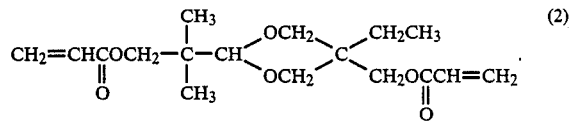

3. A UV-curable resin composition which comprises blending 100 parts by weight of a urethane acrylate, which has been prepared by reacting 4,4'-dicyclohexylmethane diisocyanate with both ends of polytetramethylene glycol having a molecular weight of 650–1300 and then reacting the reaction product with a compound having a hydroxyl group and an acryloyl group in one molecule, with 10–140 parts by weight of a compound having the formula (1) or of a compound having the formula (1) and a compound having the formula (2), and further with 1–40 parts by weight of N-vinylpyrrolidone:

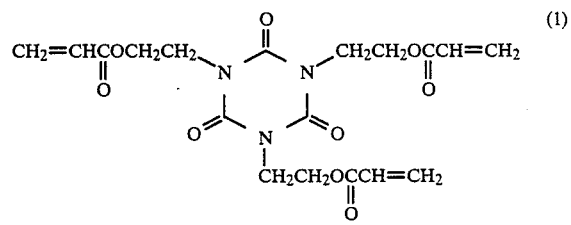

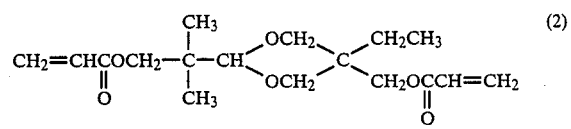

4. A UV-curable resin composition as claimed in claim 3, wherein the content of the compound having the formula (2) is less than 20 part by weight:

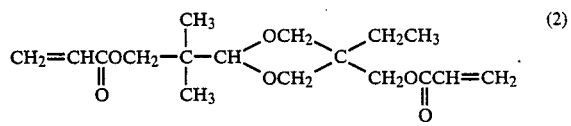

5. A UV-curable resin composition which comprises blending 100 parts by weight of a urethane acrylate, which has been prepared by reacting 4,4'-dicyclohexylmethane diisocyanate with both ends of polytetramethylene glycol having a molecular weight of 650–1300 and then reacting the reaction product with a compound having a hydroxyl group and an acryloyl group in one molecule, with 10–140 parts by weight of a compound having the formula (1) or of a compound having the formula (1) and a compound having the formula (2), and further with 1–40 parts by weight of one or more of acryloyl morpholine and dicyclopentanyl acrylate:

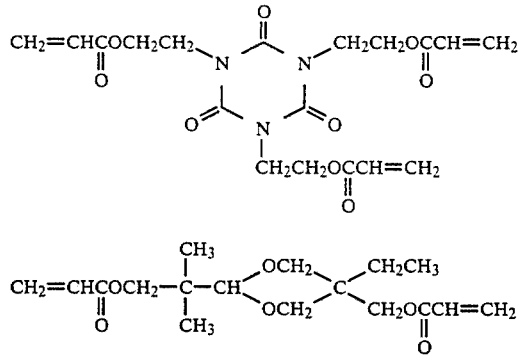

(1)

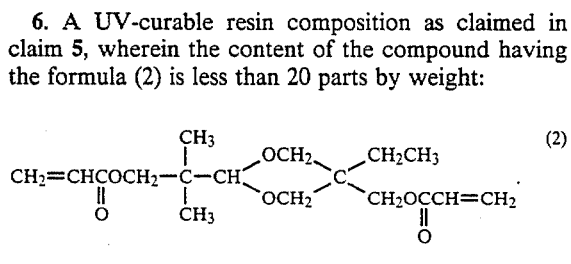

(2)

6. A UV-curable resin composition as claimed in claim 5, wherein the content of the compound having the formula (2) is less than 20 parts by weight:

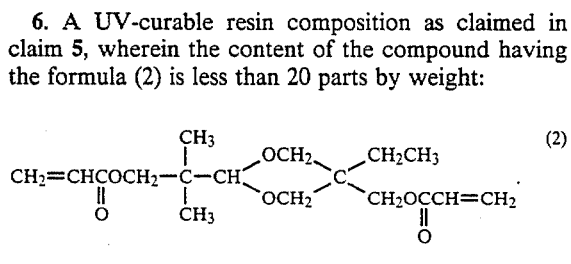

(2)

7. A UV-curable resin composition which comprises blending 100 parts by weight of a urethane acrylate, which has been prepared by reacting 4,4'-dicyclohexylmethane diisocyanate with both ends of polytetramethylene glycol having a molecular weight of 650–1300 and then reacting the reaction product with a compound having a hydroxyl group and an acryloyl group in one molecule, with 10–140 parts by weight of a compound having the formula (I) or of a compound having the formula (1) and a compound having the formula (2), with 1–40 parts by weight of one or more of acryloyl morpholine and dicyclopentanyl acrylate, and further with 1–40 parts by weight of N-vinylpyrrolidone:

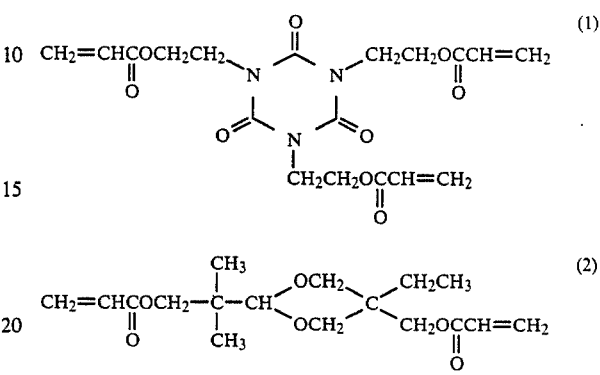

(1)

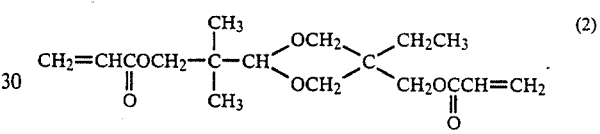

(2)

8. A UV-curable resin composition as claimed in claim 7, wherein the content of the compound having the formula (2) is less than 20 parts by weight:

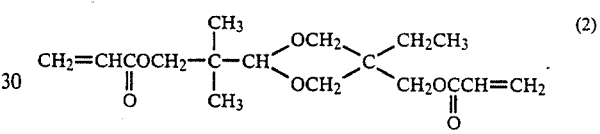

(2)

* * * * *